PULSE TIMER CIRCUIT

Filed May 2, 1966

INVENTOR.
KEISAKU NOMURA

BY

Hopgood & Calimafde

ATTORNEYS.

United States Patent Office 3,469,116

Patented Sept. 23, 1969

3,469,116

PULSE TIMER CIRCUIT

Keisaku Nomura, Tokyo, Japan, assignor to Nippon Electric Company, Limited, Tokyo, Japan, a corporation of Japan Filed May 2, 1966, Ser. No. 546,727
Claims priority, application Japan, May 4, 1965, 40/26,080
Int. Cl. H03k 3/26, 17/26, 17/28
U.S. Cl. 307—273 3 Claims

ABSTRACT OF THE DISCLOSURE

A stable pulse timer circuit for producing a pulse of stable duration substantially independent of variations of the potential source employed to supply power to the circuit is described. The timing circuit employs a first semiconductor switch which controls a second semiconductor switch. A resistive-capacitance time constant network is interposed between the two switches and is selectively shunted by the employment of one or several diodes. Resistors effective in the time constant network are selected according to a particular described relationship. Several embodiments are illustrated.

This invention relates to a pulse timer circuit, and more particularly to such a circuit that is extremely stable. The invention further preferably contemplates such a circuit in which semiconductor devices are utilized as principal control elements, and which can transmit the output pulses for a predetermined period of time from the time when input pulses are received regardless of the input pulse length.

In general, the timer circuit of the type referred to above has wide use in electronic computers, electronic telephone exchanges, and other applications. However, in all of these applications, the predetermined time periods are subject to considerable variation unless the variation of the supply voltage is held within close limits, and for this reason, separate provision for complicated and costly supply voltage stabilizing equipment is required when a precise pulse duration is desired.

Accordingly it is an object of this invention to provide a stable timing circuit and which maintains its stability despite wide voltage variations.

Figure 1:
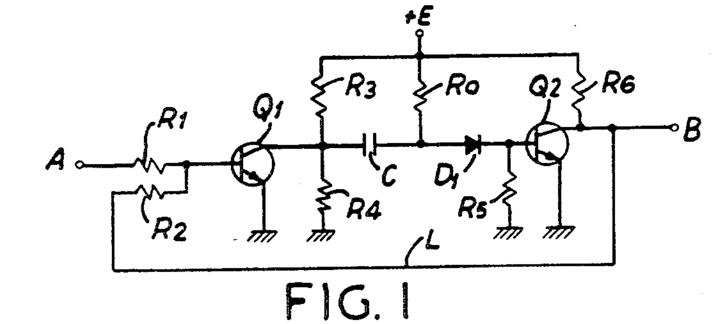
Figures 2, 3:
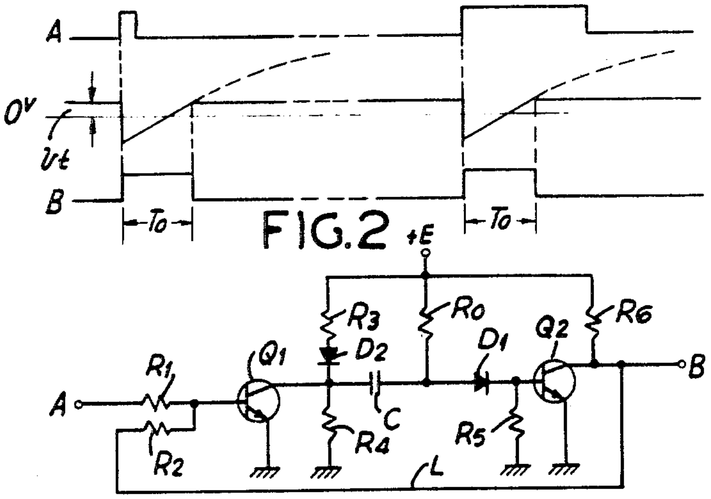
Figure 4:
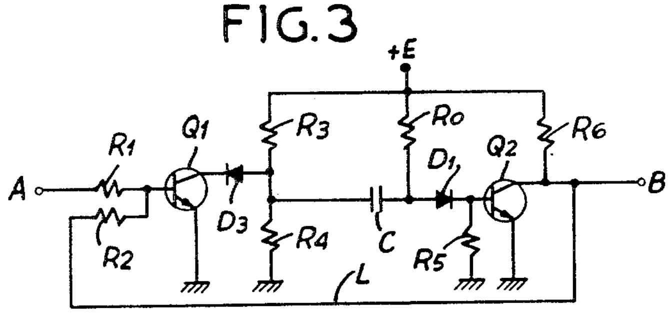
Figure 5:
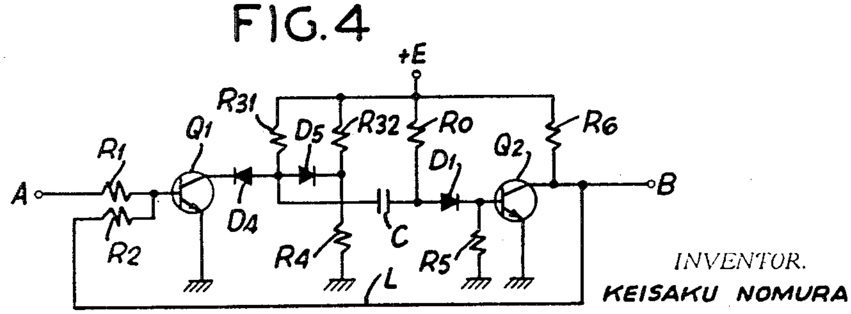

All of the objects, features and advantages of this invention and the manner of attaining them will become more apparent and the invention itself will be best understood by reference to the following description of an embodiment of the invention taken in conjunction with the accompanying drawing, in which:

FIG. 1 is a circuit diagram illustrating one conventional timer circuit,

FIG. 2 indicates waveforms used in explaining the operation of the conventional timer circuit and also of the timer circuit according to this invention, and FIGS. 3, 4 and 5 are circuit diagrams of various embodiments according to this invention.

In accordance with an aspect of the invention, timing circuit stability is significantly improved by redesigning the conventional timing circuit to include several low cost diodes and as a consequence it becomes unnecessary to stabilize the power supply voltage which is generally employed in the electronic computer, electronic exchange, or other device with which the invention is to be used. Thus, in accordane with the present invention, the whole device is made simpler in construction and lower in cost.

Further according to the present invention, the recovery time which is required for preparing successive actuations or operations, is minimized by utilizing semiconductor elements having characteristics which are the same as those in the conventional type circuits. Thus, the opertaional speed of the entire equipment package is also substantially increased.

The present invention resides in improvements in a conventional timer circuit of the type in which a capacitor is charged up to the voltage obtained by dividing the power supply voltage by two resistors after which the capacitor is discharged against the same power supply voltage just after the reception of an input pulse, thus stabilizing the pulse duration for the voltage variation of the power supply voltage.

In the timer circuit of the type described above, there is an additional disadvantage that a large size capacitor must be provided in order that a highly stable condition for pulse duration may be satisfied and in order that a predetermined pulse duration may be obtained. According to the present invention, one or more diodes are coupled to the terminal of the capacitor that is connected to the voltage division point of the power supply voltage by means of the resistors in such a manner that the forward direction voltage drop of one or more of the diodes may affect the initial charged voltage and/or the terminal voltage of the capacitor when it discharges. As a result, the same setting time or pulse duration as that generated by means of the conventional type circuit is obtained with a smaller size capacitor, and a stable pulse timer circuit is obtained in which the setting time or pulse duration is extremely stable despite substantial supply voltage variations.

Referring now to FIG. 1, which illustrates one example of conventional timer circuits, $R_0$, $R_1$, $R_2$ . . . $R_6$ designate resistors, $Q_1$ and $Q_2$ designate transistors, C designates a capacitor, and $D_1$ designates a diode, all of these constituting a type of monostable multivibrator circuit. At the standstill condition where the input voltage A, see also FIG. 2, is substantially zero, the transistor $Q_2$ remains conducting because of a current flowing from the terminal +E of the power supply, through the resistor $R_0$, the diode $D_1$ and then through the base and emitter of the transistor $Q_2$. This causes the input on the base electrode of the transistor $Q_1$ to assume a potential of approximately zero, as a result of a feedback signal supplied from the collector of the transistor $Q_2$ through a feed-back loop L and a feed-back resistor $R_2$. This causes the transistor $Q_1$ to remain nonconductive. The potential on the right hand side of the capacitor C is then at a threshold voltage $V_t$ corresponding to the sum of the base-emitter terminal voltage of the transistor $Q_2$ and the forward direction voltage drop of the diode $D_1$, and the left side potential of the capacitor C is at the divided voltage which is derived by the resistors $R_3$ and $R_4$ from the power supply voltage +E so as to be usually slightly higher than the threshold voltage $V_t$; as a result, the capacitor C is charged by the difference between these two potentials.

At this time, if the input terminal A is driven to a positive voltage by an input pulse, the transistor $Q_1$ becomes conductive, thus instantaneously reducing the left side potential of the capacitor C to a "reverse driving potential" $V_0$ which corresponds to the collector-emitter voltage of the transistor $Q_1$ when it is conductive. This voltage is then transmitted to the right side of the capacitor to reverse bias the diode $D_1$, which in turn drives the transistor $Q_2$ nonconductive.

When the transistor $Q_2$ is cutoff, the transistor $Q_1$ is driven from the power supply through the resistor $R_6$, the feedback loop L and the resistor $R_2$, thus maintaining the transistor $Q_1$ conductive during at least a predetermined time period regardless of the input pulse duration. Since the right side of the capacitor C is connected to the power supply voltage +E through the resistor $R_0$, the potential rises exponentially toward the potential +E and after a predetermined time reaches the threshold voltage $V_t$, at which level the transistor $Q_2$ is driven into the conductive state from the power supply through the resistor $R_0$ and diode $D_1$, completing one operational cycle of the timer circuit.

FIG. 2 illustrates waveforms at various circuit points which are useful in understanding the explanation of the operation of FIG. 1, and includes a waveform A at the input A, a waveform B at the output B and a waveform at the right side of the capacitor C. The time period $T_0$ illustrated is a predetermined value during which the transistor $Q_2$ is cut off as described above. Assuming the reference characters designating these components also represent their values, the predetermined time period $T_0$ will be found to be $$T_0 \doteqdot CR_0 \log_e \frac{\frac{R_3+2R_4}{R_3+R_4}E-V_t-V_0}{E-V_t}$$

and the condition required in order that the time period $T_0$ may become independent of the power supply voltage E is $$\frac{R_4}{R_3+R_4}=\frac{V_0}{V_t}$$

In the circuit shown in FIG. 1, when silicon semiconductor devices are used which have high speed characteristics, the value of $V_0$ will be about 0.2 v. and that of $V_t$ will be about 1.5 v. In order to satisfy the above relation, the resistance $R_4$ must be chosen at a considerably lower value than that of the resistor $R_3$. Thus the initially charged voltage of the capacitor C becomes less and for the purpose of obtaining a given time period, a relatively large size capacitor will be required. This is a drawback of this conventional circuit.

On the other hand, if the ratio between $R_3$ and $R_4$ is so determined that the divided voltage is a suitably high value, there will also be a drawback in that a predetermined time perior $T_0$ which is sufficiently stable for the voltage variation of the power supply voltage cannot be otbained.

FIG. 3 illustrates one embodiment of timer circuit according to this invention which is intended to eliminate the above described disadvantages of conventional circuits. In this figure, the circuit components designated by the same numerals as in FIG. 1 have the same functions as described with reference thereto. The waveforms of FIG. 2 are also pertinent regarding the explanation of voltage relations and operation of the circuit of FIG. 3. In FIG. 3, another diode $D_2$ is provided and is connected in series with the resistor $R_3$, so that the left side voltage of the capacitor C at the standstill or quiescent condition is different from the case of FIG. 1. Thus the initial charging voltage of the capacitor C is affected and if it be assumed that the forward direction voltage drop of the diode $D_2$ is $V_f$, the condition required for maintaining the predetermined time period $T_0$ independent of the power supply voltage E is calculated in the same manner as described for the circuit of FIG. 1, that is:

$$\frac{R_4}{R_3+R_4}=\frac{V_0}{V_t-V_f}$$

where $V_0$ and $V_t$ are approximately 0.2 v. and 1.5 v., respectively as described above. However, at this time the forward direction voltage drop $V_f$ in the diode $D_2$ is approximately 0.7 v., thus enabling the resistance value of $R_3$ to be approximately three times as large as the resistance value of $R_4$. Thus, the required time period can be obtained by a much smaller capacitor compared with the one used in the conventional circuit of FIG. 1 and the duration of the time period is also far more stable than in the case of that circuit.

FIG. 4 illustrates a second embodiment in accordance with this invention. In this case, a diode $D_3$ is connected between the collector terminal of the transistor $Q_1$ and the voltage dividing point between the resistors $R_3$ and $R_4$, and although the initial charging voltage of the capacitor C is similar to the case of FIG. 1, the left side voltage of the capacitor C, when the capacitor is in a discharge state, is different from that of FIG. 1. In the circuit of FIG. 4, the condition required so that a time period $T_0$ may be independent of the power supply voltage +E is written in the following form:

$$\frac{R_4}{R_3+R_4}=\frac{V_0+V_f}{V_t}$$

In this case $V_0$, $V_t$ and $V_f$ are as already described, i.e. approximately 0.2 v., 1.5 v. and 0.7 v., respectively, so that the divided voltage by means of the resistors $R_3$ and $R_4$ can be chosen at a higher value as compared with the case of FIG. 1 and a timer circuit having the same advantage as in FIG. 3 is thus obtained.

FIG. 5 is a circuit illustrating a third embodiment of this invention. In this figure, the resistor $R_3$ described in FIG. 1 is divided into two parts, namely $R_{31}$ and $R_{32}$, and further two diodes $D_4$ and $D_5$ are connected in back-to-back relationship to the voltage dividing point which determines the left side potential of the capacitor C during the standstill state. In this latest embodiment, the condition under which a time period $T_0$ becomes independent of the supply voltage E can be obtained as in the case of FIG. 3 if the equivalent resistance value of the two resistors $R_{31}$ and $R_{32}$ connected in parallel is represented by $R_3$. Thus in this case also, a timer circuit is produced which is considerably more stable than that of FIG. 1.

In the case of FIG. 5, the current flowing in the resistor $R_{32}$ is independent of the load current of the transistor $Q_1$. Therefore if the transistor $Q_1$ in FIG. 5 has the same rating as the one used in the conventional timer circuit of FIG. 1, the resistor $R_{31}$ can be chosen to have the same value as the resistor $R_3$ in FIG. 1 and the other resistors $R_{32}$ and $R_4$ can be selected at considerably lower values, thus providing a timer circuit having still another advantage, namely, that the repetition time required for completing one operation and resuming to its steady state is further reduced.

Although the timer circuit according to this invention has been described in connection with certain embodiments specifically described, it is apparent that the type of the transistors may be changed from NPN as shown to PNP, and that the diode connected at the voltage dividing point of the resistors need not be necessarily be limited to one but may be replaced by a plurality of diodes connected in series.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A stable pulse timer circuit comprising an electron control device having a control input electrode and an output electrode, a pair of terminals for connecting said circuit to a source of operating potential, an input terminal coupled to said control input electrode for receiving an input signal pulse, first and second resistors comprising a voltage divider connected in series between said pair of terminals, first and second diodes, wherein said diodes are connected in series in back-to-back relationship with one another between said connection and said output electrode, a time setting capacitor, with one terminal of said capacitor being connected to the junction between said diodes, means across said potential source for establishing a predetermined level of potential on the other capacitor terminal, and a third resistor connected between said diode junction to one of the pair of terminals connected to said operating potential source, said capacitor being alternately charged up to a level determined by the potential on said connection and discharged upon the application to said input terminal of a pulse having a predetermined amplitude, whereby a predetermined time setting is obtained betwen a given point on the resulting charge-discharge cycle.

2. A timing circuit for producing a pulse of stable duration substantially independent of variations of the potential source employed to supply power to the circuit comprising first semiconductor switching means having a control input and an output, second semiconductor switching means having a control input and an output, a capacitor having one terminal coupled to the output of the first semiconductor switching means and the other terminal coupled to the control input of the second semiconductor switching means, first and second series-connected resistors forming a voltage divider and coupled across the potential source, with the connection between said first and second resistors coupled to said output of said first semiconductor switching means, and a diode in series connection with said first and second resistors and wherein the first and second resistors are selected substantially according to the relationship $$\frac{R_a}{R_a+R_b}=\frac{V_0}{V_t-V_f}$$

where $R_a$ and $R_b$ represent said first and second resistors, $V_0$ is the potential of said one capacitor terminal during conduction of said first semiconductor switch means, $V_t$ is a potential threshold voltage of said other capacitor terminal, and $V_f$ is the forward voltage drop across said diode.

3. A timing circuit for producing a pulse of stable duration susbtantially independent of variations of the potential source employed to power the circuit comprising first semiconductor switching means having a control input and an output, second semiconductor switching means having a control input and an output, a diode having first and second electrodes with the first electrode coupled to the output of the first semiconductor switching means, first and second series-connected resistors having a voltage divider and coupled across the potential source with the connection between said first and second resistors coupled to said second diode electrode, a capacitor having one terminal coupled to the connection between said first and second resistors and the other capacitor terminal being coupled to the control input of the second semiconductor switching means, wherein the first and second resistors are selected substantially according to the relationship $$\frac{R_a}{R_a+R_b}=\frac{V_0+V_f}{V_t}$$

where $R_a$ and $R_b$ represent said first and second resistors, $V_0$ is the potential of said one capacitor terminal during conduction of said first semiconductor switch means, $V_t$ is a potential threshold voltage of said other capacitor terminal and $V_f$ is the forward voltage drop across said diode.

References Cited

UNITED STATES PATENTS

| | | | |
|---|---|---|---|
| 3,173,025 | 3/1965 | Davidson | 307—293 |
| 3,225,221 | 12/1965 | Scott | 307—293 |
| 3,278,756 | 10/1966 | Weber | 307—273 |
| 3,320,551 | 5/1967 | Miller | 307—273 |

ARTHUR GAUSS, Primary Examiner

B. P. DAVIS, Assistant Examiner

U.S. Cl. X.R.

307—265, 293, 297, 328—207